Patented Sept. 24, 1940

2,215,856

UNITED STATES PATENT OFFICE 2,215,856

PRODUCTION OF PEROXIDES AND VALUABLE METAL COMPOUNDS

Georg Pfleiderer, Ludwigshafen-on-the-Rhine, Germany, assignor, by mesne assignments, to Walter H. Duisberg, New York, N. Y.

No Drawing. Application November 10, 1936, Serial No. 110,111. In Germany November 15, 1935

17 Claims. (Cl. 23—184)

This invention relates to a process for the manufacture and production of the hydrogen, alkali metal and alkaline earth metal peroxides. It further relates to the production of said peroxides of valuable alkali metal or alkaline earth metal compounds.

It is known that alkali metal peroxides are precipitated by the treatment of hydrazobenzene in alkaline alcoholic solution, which also contains some water, with oxygen. It has also been proposed to oxidize hydrazobenzene or its derivatives in benzene with oxygen under pressure, whereby hydrogen peroxide is formed, and to reduce the azobenzene formed into hydrazobenzene in a cycle. Other organic compounds capable of autoxidation behave similarly to hydrazobenzene, especially leuco compounds which contain hydrogen atoms which are readily split off, in particular polynuclear and substituted compounds which yield by the autoxidation quinoid or indigoid compounds. For example substituted polynuclear hydroquinones which by autoxidation form quinones or molecule compounds of the nature of quinhydrone, such as anthrahydroquinone, methyl-, ethyl-, propyl- and isopropyl-anthrahydroquinones, chlor- or hydroxy-anthrahydroquinones, phenanthrene, chrysene- and retene-hydroquinones, the hydrogenation products of the said hydroquinones, such as tetrahydro-anthrahydroquinones, indigo white and its substitution products, and also the corresponding quinhydrone-like molecule compounds are suitable; the latter are suitable either as initial materials or as final products. In many cases the use of mixtures of two or more of the organic compounds indicated is advantageous.

I have now found that alkali metal peroxides can be obtained with special advantage by treating an alkaline solution of organic autoxidizable compounds to be oxidized and reduced again in a solvent mixture of at least two liquids, one of the liquids having a good dissolving power for the organic substances employed in the reaction, while the other has a good dissolving power for alkali or earth alkali. As the solvent component for the organic substances may be mentioned aromatic hydrocarbons or substitution products thereof which are inert towards the compounds involved in the process, as for example benzene, xylene, tetrahydronaphthalene and ortho-dichlorbenzene, while as the solvent component for alkali the lower aliphatic alcohols, such as ethyl and methyl alcohols are particularly suitable. By employing solvent mixtures of the said kind and providing for a sufficient content of alkali, substantially higher concentrations of the reacting organic substances and, with a given apparatus, correspondingly higher throughputs are obtained than when using only an alcohol as a solvent. Therefore the amount of liquid necessary for the production of a certain amount of alkali metal peroxide becomes correspondingly smaller and the throughput of a given apparatus becomes correspondingly larger. The unavoidable losses of solvents also become comparatively smaller. Thus, for example, in ethyl alcohol, at ordinary temperature, only about 4.4 per cent of hydrazobenzene pass into solution; with a simultaneous content of alkali the solubility is still inferior, as for example only about 3.5 per cent with an alkalinity of 0.35 normal. In a mixture of 69 parts by volume of tetrahydronaphthalene with 31 parts by volume of ethyl alcohol, however, about 65 grams of hydrazobenzene may be dissolved per each liter, the alkali contents being at the same time 0.63 mole per each liter.

The process is preferably carried out in a cycle in that the azobenzene, etc., remaining in the solution after the separation of the peroxide is reconverted into hydrazobenzene, etc., with reducing agents, preferably by means of alkali amalgam, preferably in liquid form and, if desired, partly also catalytically with hydrogen and that the substances separated with the peroxide (alkali and water) are replenished either continuously or periodically. The amalgam employed as reducing agent is regenerated electrolytically preferably in a second cycle.

I have now further found that the preparation of peroxides by the autoxidation of substances of the said kind can be combined in an advantageous manner with the recovery of valuable alkali metal or alkaline earth metal compounds by employing the following method of working:

The substance capable of autoxidation, as for example, hydrazobenzene, is prepared as indicated above by reducing a solution of that substance into which the same is converted by the oxidation, in the case selected azobenzene, by means of alkali metal amalgam. During the reduction the amalgam gives up for each molecular proportion of azobenzene two equivalents of alkali metal which passes into solution. Oxygen or a gas containing oxygen, as for example air, is then caused to act on the resulting solution or suspension of hydrazobenzene. 1 molecular proportion of hydrazobenzene thus absorbs 1 molecular proportion of oxygen with the formation of 1 molecular proportion of azobenzene and 1 molecular proportion of peroxide. The peroxide is separated. Instead of alkali metal amalgam, amalgams of other sufficiently base metals, particularly of barium, may be used.

The alkali or earth alkali which has passed into solution during the reduction is, according to the conditions, usually precipitated to a certain extent with the peroxide in the form of solid peroxide. The remainder of e. g. alkali is, according to this invention, removed from the solution in the form of other alkali compounds; this may be effected before, during or after the oxidation or separation of the peroxide. In this way the initial solution is again obtained and it may be used again for the process in a cycle after replenishing the substances used up. During the first periods of such a cyclic process, the excess of alkali may also be left partially in the solution thereby imparting to it a constant minimum alkalinity which is preferable for the recovery of solid peroxides.

The proportion of the alkali metal absorbed from the amalgam which is precipitated as alkali peroxide and the size of the residue obtained in the form of other products depend mainly on the water content which the solution of the substances capable of autoxidation has during the oxidation. If this is comparatively large, as for example about 8 per cent, there is formed, for example when using sodium as the alkali metal, the peroxide hydrate $Na_2O_2.8H_2O$. In this limiting case the whole of the alkali absorbed during the reduction is separated as peroxide so that no excess remains. If, on the other hand, the water content during the oxidation is only small, as for example about 1 per cent, there is mainly formed the hydroperoxide $NaHO_2$ with which, therefore, only half of the sodium is precipitated. With a particularly low water content, the amount of alkali in the peroxide formed may be even less, a hydroperoxide having hydrogen peroxide of crystallization being formed. In between the two limiting cases, mixtures having medium contents of alkali are formed. With many solvent mixtures the absorption power for water is limited, so that a solution from which practically pure $Na_2O_2.8H_2O$ is formed cannot directly be prepared. In this case and if the product with a high water-content is desired, water may be added during the oxidation. By working, on the contrary, with solvents which are entirely free from water, it may happen that extremely finely dispersed peroxides which are practically unfilterable are obtained. However, already in the presence of very slight amounts of water, which still may be considerably inferior to 1 per cent, the peroxides separate in a well filterable form. By the term "water contents of the solutions" there is also meant any water which may be chemically bound to the alkali. As anhydrous there is understood in this sense a solution of alkali alcoholate in the anhydrous solvent mixture. A solution of alkali hydroxide in the same solvent in contract thereto contains 1 mole of water per each equivalent of alkali.

Naturally it is always assumed that the solution still contains sufficient alkali and that too much alkali has not been removed, for example before oxidation. When using substances capable of autoxidation, such as hydrazobenzene, which may be oxidized sufficiently rapidly especially in alkaline solution, it is preferable to provide for a continuous excess of alkali content of the solution to be oxidized so that at the end of the oxidation it is still clearly alkaline. By regulating the water content of the solution during the oxidation or by suitable dimensioning of the continuous addition of water to the solution when working in a cycle it is thus possible to a certain extent to select the distribution of the alkali metal used to the formation of alkali peroxide and other alkali compounds at will.

The process may be carried out especially simply by removing the excess of alkali as such from the reduced solution. For this purpose it may first be enriched to such an extent that during the reduction the saturation is reached so that the excess thereafter during or after the reduction separates in a solid form and can be separated mechanically. This may be effected especially well by using solvent mixtures, as for example benzene and alcohol, because with these the saturation limit of the alkali can readily be regulated to any desired value which is not too high but which is sufficient in order that there should be sufficient alkali available for the formation of peroxide in the subsequent oxidation. In this manner solid alkali alcoholate or alkali hydroxide, usually with alcohol of crystallization, is obtained depending on the water content of the solution. These substances, after having been filtered off, may be recovered as such by washing, for example with benzene, and drying; they may, however, be worked up into caustic alkali solutions without previous washing and drying by dissolving them in water and separating the accompanying organic substances mechanically or by distillation, whereupon these may be added to the reaction solution again. If it is desired to obtain caustic alkali solutions, the alkali suspended in the reduced solution may also be washed out from the solution without filtration by means of water or aqueous caustic alkali solutions provided that for the organic solution a solvent is used which is not miscible with the caustic alkali solution or only slightly miscible therewith. When working in this manner it is not very important whether the alkali in the solution is previously deposited in the solid state or not. Naturally the alkali solution may dissolve a little alcohol from the solution; this may be removed by distillation and recovered.

When carrying out the process according to this invention it has been found to be specially advantageous to carry out the reduction of the organic solution with the liquid amalgam in a slightly inclined tube, if desired wound into a vertical spiral, through which the solution and amalgam flow in the same direction from top to bottom. Stoppages are thereby avoided which would otherwise be caused by the solid alkali already separating during the reduction. Instead of a single tube, a plurality of adjacent tubes or inclined surfaces, preferably provided with longitudinal channels, may be used. The solution with the suspended alkali separated from the effluent amalgam is preferably cooled, freed from the suspended alkali by simple sedimentation and then supplied to the oxidation. A branched-off portion of the current of solution may be used in order to lead the suspended alkali to a filter or washer. When it is desired to recover the suspended alkali in a dissolved form, the aqueous washing liquid is preferably allowed to drop or trickle in constant circulation through the organic solution in the lower part of the sedimentation vessel and if desired in a tubular extension of the same, whereby the alkali is dissolved out.

In this washing process, the organic solution naturally absorbs a little water from the washing liquid and this should be taken into consideration in the above-mentioned continuous addition of water.

Another modification of the process according to this invention consists in precipitating the excess of alkali as an alkali salt by the addition of an acid whch forms with the alkali metal a salt which is difficultly soluble in the solvent used, as for example carbon dioxide or hydrochloric acid. This may be effected either before or after the oxidation; in the latter case usually it is preferable to effect this after the separation of the peroxide, because otherwise the peroxide and the salt may become mixed. For many purposes, however, the preparation of such mixtures, as for example of sodium peroxide and soda, is not undesirable. In this case carbon dioxide, for example, may be directly mixed with the oxygen. In the mixtures so obtained, percarbonate may also be present. When that salt of the alkali metal is prepared which serves for the preparation of the amalgam in an electrolytic cell, usually the chloride, it may be used in a cycle for this purpose.

Instead of adding the acid to the organic solution, it may be caused to act on the separated alkali or it may be added to the aqueous solution by means of which the excess of alkali has been washed out from the organic solution. In this case this washing solution is preferably kept saturated in the salt concerned so that the newly formed salt, if desired after cooling the washing solution, is obtained directly in the solid form.

If it is desired to obtain hydrogen peroxide and not alkali metal peroxides, or if it is desired to obtain a greater proportion of the alkali in the form of other salts than would be possible with the simultaneous formation of alkali peroxides, the alkali may be removed from the reduced solution by one or more of the methods given above to such an extent that it contains little or no dissolved alkali, in any case less than 1 equivalent of alkali for each molecular proportion of the substance capable of autoxidation, the solution then being treated with oxygen. In the case of many substances capable of autoxidation, as for example hydrazobenzene, it is then preferable, in order to accelerate the reaction, to work at elevated temperature and increased pressure in the known manner. This form of the process may be carried out with special advantage with such substances capable of autoxidation as also react rapidly with oxygen in non-alkaline media with the formation of hydrogen peroxide, as for example with anthrahydroquinone derivatives. When the substance capable of autoxidation forms with the alkali metal during the reduction a compound which is insoluble in the solvent used, the substance capable of autoxidation is again set free by the action of acids or acid salts and returned to the organic solution, while at the same time the alkali salt of the added acid is formed. The hydrogen peroxide formed during the oxidation may be separated as such from the organic solution or washed out with a suitable solvent, as for example water or aqueous hydrogen peroxide solution, during or after the oxidation. Instead of water, substances may be added which are capable of adding on to or combining with the hydrogen peroxide, such as urea or magnesium hydroxide, these substances can be used dissolved or suspended e. g. in water.

Instead of carrying out the oxidation with oxygen, gases containing the same, as for example air, may be used. In some cases this offers the advantage that the formation of explosive mixtures with the solvent vapor, which might otherwise take place, is avoided. On the other hand there is the disadvantage that the effluent gases impoverished in oxygen may in some cases carry away large amounts of solvent in the form of vapor, the recovery of which necessitates considerable expenditure. In order to obtain the said advantage without the said disadvantage, there may be kept constantly in the gas chamber of the oxidation apparatus a sufficient amount of an inert gas, high-percentage oxygen being led in. In this case only a small amount of residual gas need be led away in order to prevent a great accumulation of foreign gases contained in the oxygen in the oxidation chamber.

The following examples will further illustrate the nature of this invention but the invention is not restricted to these examples. The parts, where mentioned, are by volume.

Example 1

A 0.63 normal alkaline solution of 65 grams of hydrazobenzene per each liter of the solution in a solvent mixture which for 69 parts by volume of tetrahydronaphthalene contains 31 parts by volume of absolute ethyl alcohol is treated at ordinary temperature and ordinary pressure with oxygen, 90 per cent of the theoretical amount of oxygen being absorbed within a few minutes, while at the same time the peroxide precipitates in a well filterable form. After separating the same, washing with alcohol and drying, a product is obtained having a contents of active oxygen of 27.7 per cent, corresponding to 96.8 per cent of $NaHO_2$.

Example 2

A solution of 80 grams of azobenzene per each liter of the solution in a mixture of 60 parts by volume of benzene and 40 parts by volume of ethyl alcohol is treated with sodium amalgam and thereby the azobenzene is reduced to hydrazobenzene, a solution having an alkali content of 0.86 mole per each liter being obtained. The reduced solution is then oxidized by introducing oxygen, 1.6 grams of water per each liter of oxygen absorbed being added before or during the oxidation step. 98 per cent of the theoretical amount of oxygen is absorbed, while the peroxide is precipitated in a well filterable form. After filtering, washing with the solvent mixture mentioned above and drying sodium peroxide is obtained with a contents of active oxygen of 14.1 per cent, the yield being 94 per cent of the theory, referred to the oxygen absorbed.

Example 3

A mixture consisting of 48 parts by volume of benzene and 52 parts by volume of methanol and which per each liter of the solution contains 83 grams of hydrazobenzene and 0.94 mole of alkali in a dissolved state, is treated with gaseous oxygen at normal conditions. After separating off the liquid, a peroxide is obtained, the contents of active oxygen of which corresponds to 91 per cent of the theory and which contains $NaHO_2$ and $Na_2O_2$ in a ratio of 5:1.

Example 4

A mixture of 650 cubic centimeters of benzene and 350 cubic centimeters of ethyl alcohol which, in addition to 1 per cent of water, contains 80 grams of azobenzene dissolved therein and which from a previous similar use already has an alkalinity of 0.4 $n$ is treated with liquid sodium amalgam (0.15 per cent of Na) and then cooled to room temperature. During and after the reduction, solid alkali separates consisting of sodium hydroxide, sodium ethylate and alcohol of crystallization. The precipitate is filtered off. The filtrate is still alkaline to the extent of 0.8 $n$ and is treated with oxygen at atmospheric pressure, whereby a precipitate of sodium peroxide is formed which is also filtered off, washed with alcohol and benzene and dried by moderate heat. The peroxide (26 grams) contains 24.3 per cent of active oxygen, i. e. about 90 per cent of the theoretical, which is distributed between $NaHO_2$ and $Na_2O_2$ in the molecular proportions of 13:1, and a little water of crystallization. The filtered-off alkali, without being washed or dried, is taken up with about an equal amount of water, whereby two liquid layers are formed. The upper layer is returned to the organic solution and the small amount of organic constituents dissolved in the lower layer are expelled by distillation or filtered off and also returned. There remains an about 30 per cent solution of caustic soda containing 18 grams of NaOH. The sodium withdrawn from the amalgam has thus been distributed about equally between the peroxide and the hydroxide.

*Example 5*

A solution such as is described in Example 1 is used in a cycle. After each separation of peroxide, 13 cubic centimeters of water are added for each liter of solution. The yield of peroxide is about the same as in Example 1; the active oxygen is distributed between $NaHO_2$ and $Na_2O_2$ in about the molecular proportions of 3:1 and the sodium between peroxide and hydroxide in about the proportions of 5:4. The impoverished amalgam is regenerated in an electrolytic cell and recycled.

*Example 6*

Azobenzene is dissolved in such an amount in a mixture of 650 parts of benzene and 350 parts of ethyl alcohol that after reduction to hydrazobenzene the solution is practically saturated therewith. The solution is used in a cycle. After reduction with sodium amalgam, the solid alkali thereby deposited is allowed to settle in a special settling chamber, and the clarified solution flows into the oxidation apparatus. Through the part of the settling chamber which is filled with the solid alkali there trickles in a cycle a 25 per cent aqueous caustic soda solution which dissolves the alkali. A part of the aqueous caustic soda solution is withdrawn continuously and water added instead. The withdrawal and addition are regulated so that the amount and concentration of the aqueous caustic soda solution remain constant. No water is added to the organic solution apart from that which it absorbs from the washing liquid. The caustic soda solution withdrawn from the process is purified as described in Example 1. A distribution of active oxygen and sodium similar to that in Example 2 is obtained.

*Example 7*

The procedure described in Example 3 is followed but a mixture of 60 parts of tetrahydronaphthalene and 40 parts of ethyl alcohol is used for dissolving the azobenzene and a solution of tertiary sodium phosphate which is saturated at about 18° C. is used as the washing liquid instead of caustic soda solution. Instead of adding water, an aqueous phosphoric acid is added. The washing of the organic solution is effected at a somewhat higher temperature so that the freshly formed tertiary sodium phosphate at first remains dissolved and only crystallizes out when the circulating washing solution is cooled; it is then centrifuged off and dried. The addition of phosphoric acid is so regulated that in the washing solution leaving the washer the molecular proportions of Na to $PO_4$ are always about equal to 3:1. The peroxide formed during the oxidation is filtered off and, without being washed or dried, dissolved in about 45 per cent nitric acid so that the solution is practically neutral or slightly acid. After separating the organic constituents previously adhering to the peroxide, there is obtained by distillation under reduced pressure with subsequent fractional condensation, the active oxygen in the form of a 30 per cent hydrogen peroxide and the part of the sodium previously present in the peroxide as sodium nitrate, whereby the separated sodium nitrate is washed with a little water and this washing water returned to the distillation.

The present application is a continuation-in-part of my applications Serial Nos. 23,448, filed May 25, 1935, and 80,072, filed May 16, 1936.

What I claim is:

1. The process of producing alkali metal peroxides which comprises oxidizing a solution of the corresponding alkali and of an autoxidizable organic compound which yields peroxide upon oxidation in alkaline solution in a solvent in which the alkali metal peroxide is practically insoluble, the solvent comprising the mixture of at least two organic liquids which are inert towards the compounds involved in the process and one of which has a substantial dissolving power for the said alkali, while the dissolving power of the other is smaller for the said alkali, but greater for the organic substances employed in the reaction than the dissolving power of the former, with gases comprising oxygen.

2. The process of producing alkali metal peroxides which comprises oxidizing a solution of the corresponding alkali and of hydrazobenzene in a solvent in which the alkali metal peroxide is practically insoluble, the solvent comprising a mixture of at least two organic liquids which are inert towards the compounds involved in the process and one of which has a substantial dissolving power for the said alkali, while the dissolving power of the other is smaller for the said alkali, but greater for the organic substances employed in the reaction, than the dissolving power of the former, with gases comprising oxygen.

3. The process of producing alkali metal peroxides which comprises oxidizing a solution of the corresponding alkali and of an autoxidizable organic compound which yields peroxide upon oxidation in alkaline solution with gases comprising oxygen, in a solvent in which the alkali metal peroxide is practically insoluble, the solvent comprising a mixture of at least two organic liquids which are inert towards the compounds involved in the process and one of which has a substantial dissolving power for the said alkali, while the dissolving power for the other is smaller for the said alkali, but greater for the organic substances employed in the reaction than the dissolving power of the former, the former liquid being a low molecular aliphatic alcohol, the other being selected from the group consisting of liquid aromatic hydrocarbons and liquid substitution products thereof.

4. The process of producing alkali metal peroxides which comprises passing a solution of the corresponding alkali and of an autoxidizable organic compound which yields peroxide upon oxidation in alkaline solution, in a solvent in which the alkali metal peroxide is practically insoluble, the solvent comprising a mixture of at least two organic liquids which are inert towards the compounds involved in the process, and one of which has a substantial dissolving power for the said alkali, while the dissolving power of the other is smaller for the said alkali but greater for the organic substances employed in the reaction than the dissolving power of the former, in a cycle while alternately oxidizing with gases comprising oxygen and reducing again partly with alkali metal amalgam and partly by any well known method not increasing the alkali metal content of the solution, the precipitated peroxide being separated between the two operations and the substances removed from the solution being replenished.

5. The process of producing alkali metal peroxides which comprises oxidizing a solution of the corresponding alkali and of hydrazobenzene which yields peroxide upon oxidation in alkaline solution with gases comprising oxygen, in a solvent in which the alkali metal peroxide is practically insoluble, the solvent comprising a mixture of at least two organic liquids which are inert towards the compounds involved in the process and one of which has a substantial dissolving power for the said alkali, while the dissolving power of the other is smaller for the said alkali, but greater for the organic substances employed in the reaction than the dissolving power of the former, the former liquid being a low molecular aliphatic alcohol, the other being selected from the group consisting of liquid aromatic hydrocarbons and liquid substitution products thereof.

6. The process of producing alkali metal peroxides which comprises oxidizing a solution of the corresponding alkali and of hydrazobenzene in a mixture of tetrahydronaphthalene and ethyl alcohol, with gases comprising oxygen.

7. The process of producing alkali metal peroxides which comprises oxidizing a solution of the corresponding alkali and of hydrazobenzene a mixture of benzene and of ethyl alcohol, with oxygen.

8. The process of producing alkali metal peroxides which comprises oxidizing a solution of the corresponding alkali and of hydrazobenzene in a mixture of benzene and of methanol, with gases comprising oxygen.

9. The process of producing alkali metal and alkaline earth metal peroxides which comprises oxidizing a solution of the corresponding alkali and of hydrazobenzene in a mixture of about 69 parts by volume of tetrahydronaphthalene and about 31 parts by volume of ethyl alcohol, with gas comprising oxygen.

10. The process of producing alkali metal peroxides which comprises oxidizing a solution of the corresponding alkali and of hydrazobenzene in a mixture of about 60 parts by volume of benzene and about 40 parts by volume of ethyl alcohol, with gas comprising oxygen.

11. The process of producing alkali metal peroxides which comprises oxidizing a solution of the corresponding alkali and of hydrazobenzene in a mixture of about 48 parts by volume of benzene and about 52 parts by volume of methanol, with gas comprising oxygen.

12. The process for simultaneously producing peroxides and other alkali compounds which comprises preparing an alkaline solution of an autoxidizable compound which yields peroxide upon oxidation in alkaline solution in an organic solvent mixture for said autoxidizable compound containing a lower aliphatic alcohol, by reducing the organic product into which the autoxidizable compound is oxidized by oxygen with an amalgam selected from the class consisting of alkali metal and alkaline earth metal amalgams, oxidizing the alkaline solution with oxygen and separating the alkali peroxide formed, said solvent mixture being so proportioned as to cause precipitation of a portion of the alkali compound in the reducing stage and of the alkali peroxide in the oxidation stage.

13. The process as defined in claim 12, wherein an acid is added to effect precipitation of the alkali compound in the form of a salt of said acid.

14. The process as defined in claim 12, wherein the alkali compound is selected from the class consisting of an alkali alcoholate and alkali hydroxide.

15. The process as defined in claim 12, wherein the amalgam is a barium amalgam, the alkali compound is a barium compound and the alkali peroxide is a barium peroxide.

16. The process as defined in claim 12, wherein the amalgam is an alkali metal amalgam, the alkali compound is an alkali metal compound and the alkali peroxide is an alkali metal peroxide.

17. The process as defined in claim 12, wherein more of the alkali dissolved from the amalgam is precipitated in the form of an alkali compound than in the form of an alkali peroxide.

GEORG PFLEIDERER.